US009658663B2

(12) United States Patent
Huang et al.

(10) Patent No.: US 9,658,663 B2
(45) Date of Patent: May 23, 2017

(54) THERMALLY-AWARE THROTTLING IN A THREE-DIMENSIONAL PROCESSOR STACK

(71) Applicant: Advanced Micro Devices, Inc., Sunnyvale, CA (US)

(72) Inventors: Wei Huang, Austin, TX (US); Manish Arora, Sunnyvale, CA (US); Yasuko Eckert, Bellevue, WA (US); Indrani Paul, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/862,044

(22) Filed: Sep. 22, 2015

(65) Prior Publication Data
US 2017/0083065 A1    Mar. 23, 2017

(51) Int. Cl.
| G06F 1/28 | (2006.01) |
| G06F 1/30 | (2006.01) |
| G06F 1/20 | (2006.01) |
| G06T 1/20 | (2006.01) |
| G06F 1/32 | (2006.01) |
| G06F 11/30 | (2006.01) |

(52) U.S. Cl.
CPC ............ G06F 1/206 (2013.01); G06F 1/3234 (2013.01); G06F 1/3296 (2013.01); G06T 1/20 (2013.01); G06F 1/3206 (2013.01); G06F 11/3024 (2013.01); G06F 11/3058 (2013.01)

(58) Field of Classification Search
CPC .. G06F 1/206; G06F 11/3024; G06F 11/3058; G06F 1/3206
USPC .......................... 713/300, 320, 322, 323, 330
See application file for complete search history.

(56) References Cited

U.S. PATENT DOCUMENTS

| 2004/0128100 A1* | 7/2004 | Rotem | ...................... G01K 7/42 702/136 |
| 2014/0317389 A1* | 10/2014 | Wenisch | ................... G06F 1/20 712/229 |

\* cited by examiner

*Primary Examiner* — Michael J Brown

(57) ABSTRACT

A three-dimensional (3-D) processor stack includes a plurality of processor cores implemented in a plurality of layers. A controller is to selectively throttle one or more of a plurality of processor cores in response to detecting a thermal event. The controller selectively throttles the one or more of the plurality of processor cores based on values of thermal couplings between the plurality of layers and based on measures of criticality of threads executing on the plurality of processor cores.

20 Claims, 6 Drawing Sheets

| THERMAL COUPLINGS 600 | | |
|---|---|---|
| LOCATION 1 | LOCATION 2 | COUPLING |
| LEVEL 1 | LEVEL 2 | HIGH |
| LEVEL 1 | LEVEL 3 | MEDIUM |
| ... | ... | ... |
| LEVEL N-1 | LEVEL N | LOW |

FIG. 6

THERMALLY-AWARE THROTTLING IN A THREE-DIMENSIONAL PROCESSOR STACK

BACKGROUND

Field of the Disclosure

The present disclosure relates generally to processor systems and, more particularly, to three-dimensional processor stacks.

Description of the Related Art

Conventional processing systems are based on two-dimensional (2-D) structures such as a system-on-a-chip (SoC), which may include a variety of components of different sizes and processing capabilities. For example, a heterogeneous SoC may include a combination of processor cores such as one or more central processing units (CPUs), one or more graphics processing units (GPUs), or one or more specialized hardware accelerator processors. A higher level of integration can be achieved by implementing the processing system as a three-dimensional (3-D) structure formed by stacking and interconnecting multiple silicon layers that each include one or more processor cores. The stacked silicon layers in the 3-D processor stack are separated by distances of tens to hundreds of microns and exhibit a high degree of thermal coupling. Thus, heat generated in one or more processor cores of one silicon layer can raise the temperature of the processor cores in the other silicon layers in the 3-D processor stack.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 6 is a diagram of a data structure that includes information indicating thermal couplings between locations in a processing system according to some embodiments.

DETAILED DESCRIPTION

Figure 1:
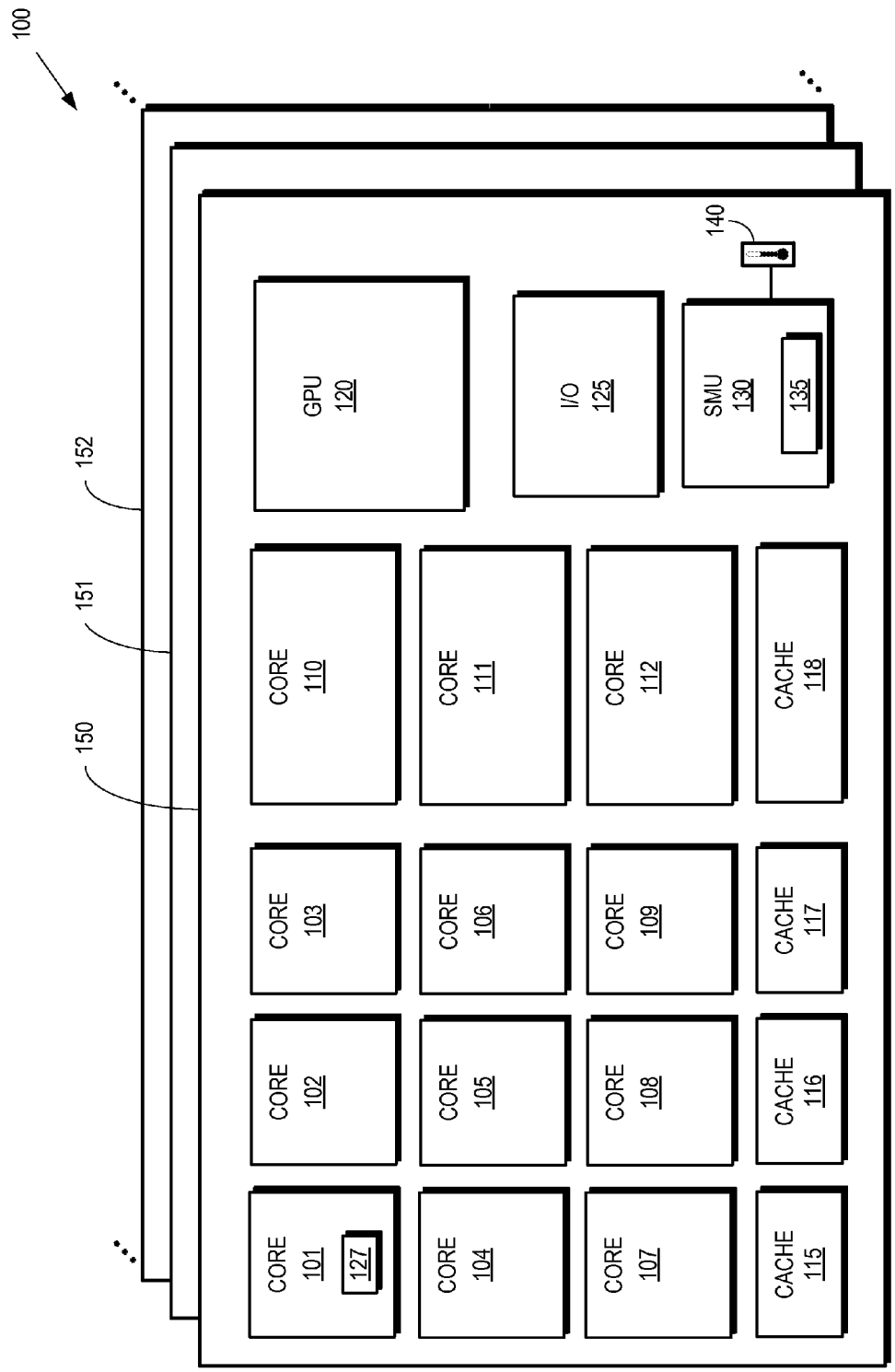
FIG. 1 is a block diagram of a processing device that includes a 3-D processor stack in accordance with some embodiments.

Thermal management techniques that are appropriate for 2-D structures often are less effective or even counterproductive when applied to 3-D structures. For example, static assignment of threads to different processor cores prior to execution of the threads cannot, by definition, be used to address all possible thermal emergencies at run-time. As used herein, the term "thermal emergency" refers to the temperature of a processor core or other entity in a processing system exceeding a threshold temperature that indicates a potential for damage due to overheating. For another example, dynamically migrating threads from high temperature processor cores to low temperature processor cores incurs significant performance overhead and may not effectively reduce the temperature in the 3-D structure due to the high degree of thermal coupling between the layers. For yet another example, throttling threads based on their power density or power consumption may incur a significant performance loss because high power density (or consumption) threads are typically performance critical threads.

Thermal emergencies in a 3-D processor stack can be avoided or mitigated at run-time by selectively throttling one or more of a plurality of processor cores implemented in a plurality of layers of the 3-D processor stack based on values of thermal couplings between the plurality of processor cores in the plurality of layers and based on measures of criticality of threads executing on the plurality of processor cores. In some embodiments, the values of the thermal couplings indicate temperature changes in each of the plurality of layers (or each of the plurality of processor cores) as a function of temperature changes in each of the other layers (or each of the other processor cores). For example, the values of the thermal couplings may indicate a level or degree of thermal coupling between different locations. The values of the thermal couplings may also include temporal information related to the thermal coupling values. For example, the temporal information may indicate latencies between temperature changes in each of the plurality of layers or processor cores. In some embodiments, the values of the thermal couplings indicate coarse levels of the thermal couplings, such as a low level of thermal coupling to indicate that a temperature change in a layer or processor core has a small thermal impact on the temperature in another layer or processor core, a medium level of thermal coupling to indicate that a temperature change in a layer or processor core has a moderate thermal impact on the temperature in another layer or processor core, and a high level of thermal coupling to indicate that a temperature change in a layer or processor core has a large thermal impact on the temperature in another layer or processor core.

Measures of the criticality of the threads may include indicators of criticality provided by an operating system or values of hardware event counters associated with the threads, such as instruction counts or floating-point operation counts. In some embodiments, selectively throttling one or more of the processor cores includes predicting or detecting a thermal event associated with a critical thread in a first layer (or a first processor core in the first layer) and, in response, throttling a second layer (or a second processor core) that has a strong thermal coupling to the first layer and is executing a non-critical thread. Additional non-critical threads in other layers or cores may also be throttled to provide additional thermal impact and, if throttling non-critical threads does not mitigate the thermal emergency, the critical thread may be throttled.

FIG. 1 is a block diagram of a processing device 100 that includes a 3-D processor stack in accordance with some embodiments. The 3-D processor stack includes a plurality of layers 150, 151, 152 (referred to collectively as "the layers 150-152") that may be formed on individual substrates or dies. The layers 150-152 are interconnected using any of a variety of interconnect structures, such as pins, balls, traces, wires, interposers, and the like. Although three layers 150-152 are shown in FIG. 1, some embodiments of the 3-D processor stack may include different numbers of layers. The layer 150 is a heterogeneous processing device that includes multiple processor cores 101, 102, 103, 104, 105, 106, 107, 108, 109, 110, 111, 112 (collectively referred to herein as "the processor cores 101-112") that can independently execute instructions concurrently or in parallel. In some embodiments, the processor cores 101-112 may be associated with one or more CPUs (not shown in FIG. 1). The processor cores 101-112 are associated with one or more caches 115, 116, 117, 118 that are collectively referred to herein as "the caches 115-118". Some embodiments of the caches 115-118 may include an L2 cache for caching instructions or data, one or more L1 caches, or other caches. Some embodiments of the caches 115-118 may be subdivided into an instruction cache and a data cache.

In the illustrated embodiment, the layers 151, 152 are also heterogeneous processing devices that implement the same number of processor cores and caches in the same layout as the layer 151. Other entities implemented in the layer 150 (as discussed in detail below) are also implemented in the layers 151, 152 and are implemented at the same location in the layers 151, 152. However, some embodiments of the layers 151, 152 implement different numbers of processor cores, caches, or other entities than the layer 150. Furthermore, the processor cores, caches, or other entities may be distributed at different locations on the layers 151, 152 relative to the locations of these elements on the layer 150.

The processor cores 101-112 or the caches 115-118 may have different sizes. For example, the processor cores 101-109 may be smaller than the processor cores 110-112 and the caches 115-117 may be smaller than the cache 118. The size of a cache is typically determined by the number or length of lines in the cache. The size of a processor core may be determined by the instructions per cycle (IPCs) that can be performed by the processor core, the size of the instructions (e.g., single instructions versus very long instruction words, VLIWs), the size of caches 115-118 implemented in or associated with the processor cores 101-112, whether the processor core supports out-of-order instruction execution (larger) or in-order instruction execution (smaller), the depth of an instruction pipeline, the size of a prefetch engine, the size or quality of a branch predictor, whether the processor core is implemented using an x86 instruction set architecture (larger) or an ARM instruction set architecture (smaller), or other characteristics of the processor cores 101-112. The larger processor cores 110-112 may consume more area on the die, consume more power, and generate more heat relative to the smaller processor cores 101-109. The number or size of processor cores in the processing device 100 is a matter of design choice. Some embodiments of the processing device 100 may include more or fewer processor cores 101-112 and the processor cores 101-112 may have a different distribution of sizes.

A graphics processing unit (GPU) 120 also may be included in the processing device 100 for creating visual images intended for output to a display, e.g., by rendering the images on a display at a frequency determined by a rendering rate. Some embodiments of the GPU 120 may include multiple cores, a video frame buffer, or cache elements that are not shown in FIG. 1 in the interest of clarity. In some embodiments, the GPU 120 may be larger than some or all of the processor cores 101-112. For example, the GPU 120 may be configured to process multiple instructions in parallel, which may lead to a larger GPU 120 that consumes more area and more power than some or all of the processor cores 101-112.

The processing device 100 includes an input/output (I/O) engine 125 for handling input or output operations associated with elements of the processing device such as keyboards, mice, printers, external disks, and the like.

The processor cores 101-112 and the GPU 120 can perform operations such as executing instructions from an application or a phase of an application. As used herein, the term "application phase" refers to a portion of an application that can be scheduled for execution on a component of the processing device 100 independently of scheduling other portions, or other application phases, of the application. The size of an application phase may range from a single instruction to all of the instructions in the application. An application phase may correspond to an application kernel, which refers to a particular portion of an application defined by the programmer, such as a function, a subroutine, a code block, and the like. Each application phase may run for a different duration, exhibit different mixes of active events and idle events, and have different computational intensities or be more or less memory bounded. Application phases may also have different thermal properties or characteristics. For example, different application phases may induce different thermal rise times in the processor cores 101-112 or the GPU 120, may have different thermal intensities, or may exhibit different thermal profiles when executed on the different processor cores 101-112 or the GPU 120, as discussed herein. A set of instructions for an application or a phase of an application may be referred to as a thread.

The processor cores 101-112 the GPU 120, the I/O engine 125 or other components in the processing device 100 include counters 127 (only one shown in the interest of clarity) such as hardware event counters that include values representing a number of corresponding events that have occurred, for example, since the counter 127 was last reset. Thus, the counter 127 is incremented in response to detecting the corresponding hardware event. Examples of hardware events include execution of an instruction, execution of a floating-point operation, a cache miss, a memory access, and the like. The counter 127 may therefore represent an array or set of counters that are used to count the number of instructions that have been executed, a number of floating-point operations that have been executed, a number of cache misses, a number of memory accesses, and the like.

The processor cores 101-112 the GPU 120, the I/O engine 125 or other components in the processing device 100 may have different thermal densities or thermal sensitivities. As used herein, the term "thermal density" indicates the amount of power dissipated per unit area or the amount of heat dissipation per unit area at a location or by a component in the processing device 100. As used herein, the term "thermal sensitivity" indicates how sensitive the temperature at a particular location or in a particular component is to changes in the thermal density in a region proximate the location, which may include regions on the same layer 150-152 or regions on different layers 150-152 in the 3-D processor stack. A region with a higher thermal sensitivity rises to a higher temperature than a region with a lower thermal sensitivity when the two regions are exposed to the same thermal density. The thermal density or thermal sensitivity of a portion of the processing device 100 may depend on a variety of factors that may in turn interact with each other. The following discussion provides examples of factors that may affect the thermal density or thermal sensitivity but thermal densities or thermal sensitivities in some embodiments of the processing device 100 may be influenced by other factors or other combinations of factors or interactions between factors.

The thermal density or the thermal sensitivity of components such as the processor cores 101-112 or the GPU 120 may depend on the size of the processor cores 101-112 or the size of the GPU 120. For example, the thermal density of the smaller processor cores 101-109 may be smaller than the thermal density of the larger processor cores 110-112, whereas the thermal sensitivity of the smaller processor cores 101-109 may be larger than the thermal sensitivity of the larger processor cores 110-112. Some embodiments of the GPU 120 may be more thermally efficient and therefore have lower thermal densities or thermal sensitivities than other entities in the processing device 100 such as the processor cores 101-112. Thus, the GPU 120 may operate at a lower temperature than the processor cores 101-112 when the GPU 120 and the processor cores 101-112 are consuming the same amount of power.

The thermal density or the thermal sensitivity of components such as the processor cores 101-112 or the GPU 120 may also depend on the 3-D distribution or layout of the processor cores 101-112 or the GPU 120 in layers 150-152 the processing device 100. In some embodiments, thermal sensitivity is larger in portions of the processing device 100 that include a larger density of circuits because changes in the power dissipated in higher density circuits can lead to more rapid changes in the local temperature. The thermal sensitivity may also be larger at the center of a substrate (or in a middle layer such as the layer 151) because circuits at these locations may not be as close to external heat sinks (if present) and therefore do not dissipate heat as efficiently as circuits near the edge of the substrate that are closer to the external heat sinks. For example, the thermal sensitivity of the processor core 105 may be larger than the thermal sensitivity of the processor core 101. Proximity to components that have a relatively low thermal density/sensitivity may also decrease the thermal density/sensitivity of a component. For example, the thermal sensitivity of the processor core 109 may be lower than the thermal sensitivity of the processor core 103 because the processor core 109 is near the cache 117, which has a lower thermal sensitivity. Stacking multiple layers 150-152 in the 3-D processor stack may also affect the thermal density and thermal sensitivity because heat can be efficiently conducted between the stacked substrates of the layers 150-152.

The thermal density or the thermal sensitivity of components such as the processor cores 101-112 or the GPU 120 may also depend on the workload or workloads being executed by the processor cores 101-112 or the GPU 120. For example, the thermal densities of a pair of adjacent components such as the processor cores 101-102 may be relatively high if they are independently processing two high-power workloads and there is no resource contention between the workloads being processed on the different compute units so the processor cores 101-102 are able to retire instructions at a high rate. The temperatures of the compute units may therefore increase while processing the high-power workloads due to the relatively high heat dissipation, potentially leading to thermal emergencies, e.g., when the temperature of a compute unit exceeds a threshold temperature. For another example, the thermal densities of the processor cores 101 and 109 may be relatively lower than the previous example even if they are independently processing the same two high-power workloads because the heat can be efficiently dissipated by other structures such as the cache 117, idle processor cores 102, 104, 105, or external heat sinks.

The thermal density or the thermal sensitivity of components such as the processor cores 101-112 or the GPU 120 may also depend on whether the workload or workloads being executed by the processor cores 101-112 or the GPU 120 are computationally intensive or memory bounded. For example, a processor core 101 that is executing a computationally intensive application phase may retire a relatively large number of instructions per cycle and may therefore dissipate a larger amount of heat. The processor core 101 may therefore exhibit a high thermal density or thermal sensitivity. For another example, an application phase that is memory bounded may exhibit relatively short active periods interspersed with relatively long idle periods and may therefore dissipate a smaller amount of heat. A processor core running the memory bounded application phase may therefore exhibit a low thermal density or thermal sensitivity.

The thermal density or the thermal sensitivity of components such as the processor cores 101-112 or the GPU 120 may also depend on the performance state of the processor cores 101-112 or the GPU 120. For example, the thermal density or thermal sensitivity of the processor core 101 may be higher than the thermal density or thermal sensitivity of the processor core 102 if the processor core 101 is operating at a higher voltage or frequency than the processor core 102. For another example, the thermal density or thermal sensitivity of the processor core 101 may increase (or decrease) in response to a change in the performance state that causes the operating voltage or frequency of the processor core 101 to increase (or decrease).

The processing device 100 implements a system management unit (SMU) 130 to manage thermal and power conditions in the processing device 100. Some embodiments of the SMU 130 operate according to policies set by an operating system implemented in the processing device 100. The SMU includes a thermal sensitivity map 135 that indicates the sensitivity of the layers 150-152 (or other entities implemented thereon) to temperature changes in the other layers 150-152 (or other entities implemented thereon). The thermal sensitivity of one location to another location may depend on a distance between the locations, composition of materials at or between the locations, the geometry of structures at or between the locations, the type of entity (e.g., small processor cores 101-109, large processor cores 110-112, GPU 120, etc.) at the locations, and the like. Some embodiments of the thermal sensitivity map 135 include entries that indicate a degree temperature rise at one location for every degree temperature rise in another location. For example, the thermal sensitivity of the large processor core 110 to the small processor core 103 may indicate that a temperature change of 10° C. in the small processor core 103 generates a change in temperature of 2° C. in the large processor core 110 after a relatively short latency. For another example, the thermal sensitivity of a small processor core in the layer 152 to the large processor core 110 in the layer 150 may indicate that a temperature change of 10° C. in the large processor core 110 generates a change in temperature of 5° C. in the small processor core after a relatively long latency caused by a relatively long diffusion time between the layers 150, 152.

The thermal sensitivity map 135 may represent different levels of thermal granularity. For example, the thermal sensitivity map 135 may have a low level of thermal granularity and include information indicating a high, medium, or low degree of thermal sensitivity of each of the layers 150-152 to each of the other layers 150-152. For another example, the thermal sensitivity map 135 may have a high level of thermal granularity and be represented as a look up table that indicates a temperature change ($\Delta T_i$) at the i-th location as a function of a temperature change ($\Delta T_j$) at the j-th location, e.g., using the relationship $\Delta T_i = k_{ij} \Delta T_j$. For yet another example, the thermal sensitivity map 135 may determine a substantially continuous functional relationship between a temperature change ($\Delta T_i$) at the i-th location and a temperature change ($\Delta T_j$) at the j-th location, e.g., using the function $\Delta T_i = f(\Delta T_j)$.

The thermal sensitivity map 135 may also represent different levels of spatial granularity. For example, the spatial granularity may be coarse and the thermal sensitivity map 135 may represent relationships between temperatures averaged over the layers 150-152. For another example, the spatial granularity may be relatively fine and the thermal sensitivity map 135 may relate temperatures at each of the processor cores 101-112, the caches 115-118, the GPU 120, or the I/O engine 125 to each of the other entities implemented on the layers 150-152. For yet another example, the thermal sensitivity map 135 may relate temperatures at a grid of locations distributed across the layers 150-152.

The thermal sensitivity map 135 may also include information indicating latencies between temperatures in different layers 150-152 or different locations within the layers 150-152. The latencies may be determined by characteristics such as diffusion timescales for heat diffusion across the layers 150-152 or between the layers 150-152. The temporal information may be represented at different levels of granularity. For example, the thermal sensitivity map 135 may include information indicating an average time delay for heating at a first location in response to a temperature rise at a second location. The latencies between temperature changes at different locations may be binned into discrete time intervals or may be represented as a substantially continuous relationship between the temperature change at one location of a temperature change at another location as a function of time. Some embodiments of the thermal sensitivity map 135 use different combinations of spatial, thermal, or temporal granularity.

One or more temperature sensors 140 (only one shown in the interest of clarity) are deployed at one or more locations on the layers 150-152. The temperature sensors 140 are used to measure temperatures at locations on the layers 150-152. Signals indicating the measured temperatures may be provided to the SMU 130. The number of temperature sensors 140 may correspond to the spatial granularity of the thermal sensitivity map 135. For example, one temperature sensor 140 may be deployed on each of the layers 150-152 to measure a temperature associated with each of the layers 150-152 when the thermal sensitivity map 135 only relates temperatures on the layers 150-152. For another example, temperature sensors 140 may be deployed at locations associated with the processor cores 101-112, the caches 115-118, the GPU 120, the I/O engine 125, or other locations when the thermal sensitivity map 135 relates temperatures at these different entities in the layers 150-152.

The SMU 130 is also able to access information indicating criticality of one or more threads executing in the processing device 100, such as values of the counters 127. Some embodiments of the SMU 130 determine a degree of criticality of threads that are executing on the processor cores 101-112 or the GPU 120 using the values of the counters 127. For example, if a set of threads are executing concurrently on the small processor cores 101-109, the counters 127 are expected to have approximately the same values (on average) because each of the small processor cores 101-109 are expected to execute approximately the same number of instructions (on average) for each thread. Consequently, if values for the counters 127 for a first thread are significantly different than values of the counters 127 for other threads, the SMU 130 may identify the first thread as a critical thread. For example, the first thread may be identified as a critical thread if the value of an instruction counter for the first thread indicates that the number of first thread instructions that have been executed is greater than an average value of the number of instructions that have been executed in the other threads. The larger value of the instruction counter for the first thread indicates that the other threads are waiting for some portion of the first thread to complete before they can continue execution. In some embodiments, criticality of the threads is indicated by information generated by an operating system implemented in the processing device 100. Some embodiments of the SMU 130 determine criticality of threads based on values of the counters 127 in combination with information generated by the operating system.

The SMU 130 controls power supplied to entities such as the processor cores 101-112 or the GPU 120 and adjusts operating points of the processor cores 101-112 or the GPU 120, e.g., by changing an operating frequency of the processor cores 101-112 or the GPU 120 or by changing an operating voltage supplied to the processor cores 101-112 or the GPU 120. The SMU 130 or portions thereof are therefore referred to as a power management unit in some embodiments. The SMU 130 may throttle the processor cores 101-112 or the GPU 120 by reducing the power supplied to these entities, reducing the operating frequency of these entities, or reducing the operating voltage supplied to these entities. Throttling may be performed in response to detecting thermal emergencies or in response to predictions of future thermal emergencies. For example, the SMU 130 may detect a thermal emergency if a temperature measured by one of the temperature sensors 140 exceeds a first threshold value. For another example, the SMU 130 may predict a thermal emergency if a temperature measured by one of the temperature sensors 140 exceeds a second threshold value (less than the first threshold value) and previous measurements of temperatures indicate a rate of increase of the temperature that predicts that the temperature may exceed the first threshold (or some other threshold) within a predetermined time interval. The SMU 130 may then selectively throttle one or more of the processor cores 101-112 or the GPU 120 based on values of thermal couplings indicated in the thermal sensitivity map 135 and based on measures of criticality of threads executing on the processor cores 101-112 or the GPU 120, as discussed herein.

Figure 2:
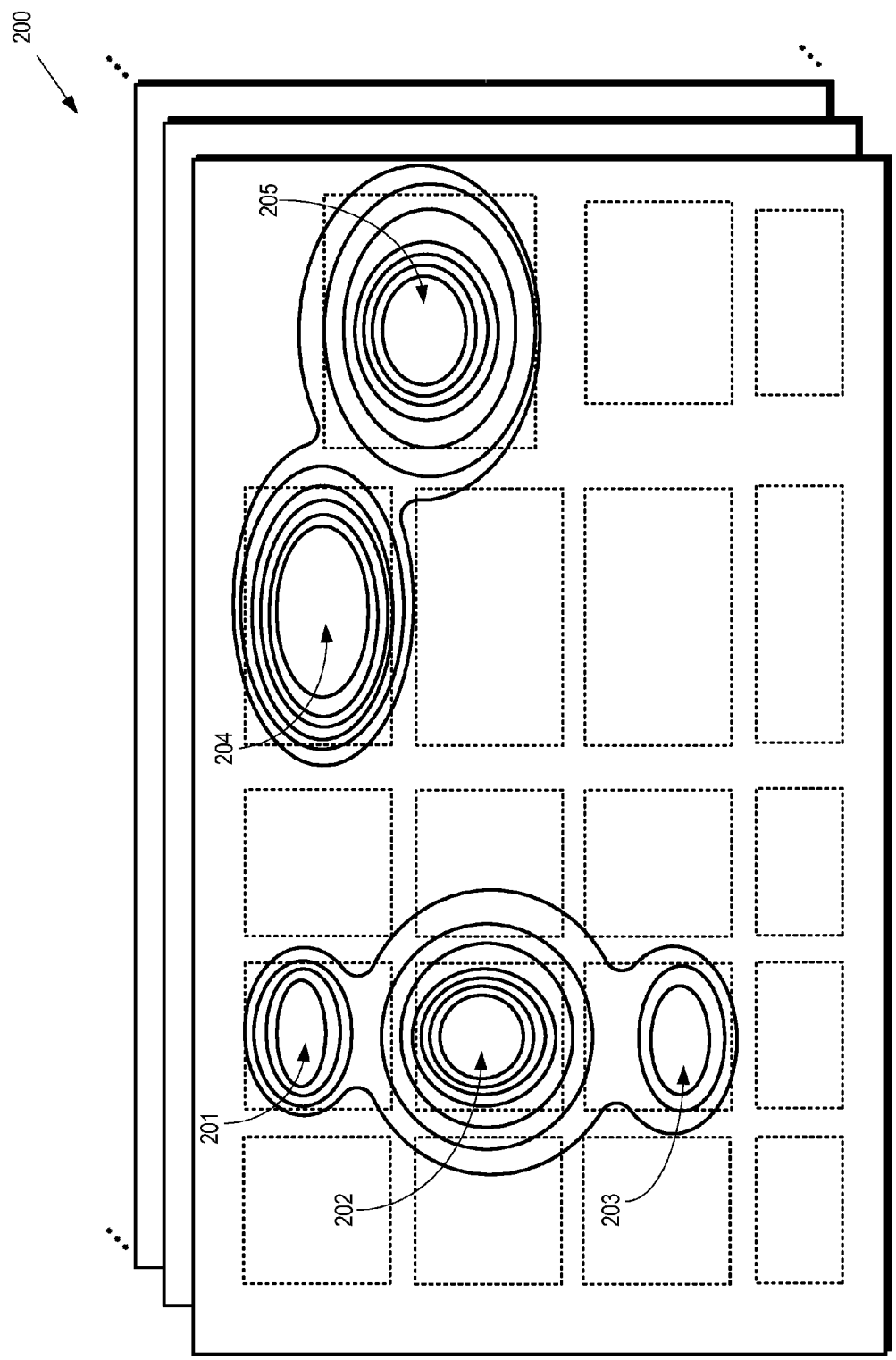
FIG. 2 is a contour plot of a thermal density map for a processing device such as the processing device shown in FIG. 1 according to some embodiments.

FIG. 2 is a contour plot of a thermal density map 200 for a processing device such as the processing device 100 shown in FIG. 1 according to some embodiments. Locations of the processor cores 101-112, the caches 115-118, the GPU 120, the I/O engine 125, and the SMU 130 are indicated by dashed lines to facilitate comparison with the processing device 100 shown in FIG. 1. Some embodiments of the thermal density map 200 may be generated using sensor monitors, temperature monitors, or other devices that can be used to measure or infer the temperature at different locations on the processing device 100 such as the temperature sensors 140 shown in FIG. 1. The thermal density map 200 (or information derived therefrom) may be provided to a system management unit such as the SMU 130 shown in FIG. 1 to facilitate selective throttling of threads, as discussed herein.

The contours of the thermal density map 200 indicate one or more thermal conditions such as the presence of thermal density peaks 201, 202, 203, 204, 205 (collectively referred to as "the thermal density peaks 201-205") associated with the processor cores 102, 105, 108, 110 and the GPU 120. The thermal density peaks 201-205 may be represented as temperature peaks. For example, each contour may indicate a difference of 0.5° C. and so the processor core 105 may be at a temperature that is approximately 1.5° C. higher than the temperature of the processor core 102, which may be approximately 2° C. higher than the temperature of the processor core 101. For another example, the GPU 120 may be approximately 3-4° C. higher than the temperature of the processor core 112. Some embodiments of the thermal density map 200 may also indicate absolute temperatures. For example, the temperature of the processor core 101 may be approximately 95° C. and the temperature of the processor core 102 may be approximately 97° C.

The thermal density map 200 also indicates that temperature peaks can influence the temperature in adjacent components. For example, the peak 202 in the thermal density map 200 over the processor core 105 extends into the adjacent processor cores 102, 104, 106, 108 because of thermal coupling effects. The temperatures in the adjacent processor cores 102, 104, 106, 108 may therefore be determined by the threads that have been scheduled to the processor core 105 as well as threads that have been scheduled to the adjacent processor cores 102, 104, 106, 108. The thermal density peaks 201-205 may also heat portions of adjacent layers in the 3-D processor stack due to the diffusion of heat between the layers. Heating of the processor cores (or locations in other layers in the 3-D processor stack) by the thermal density peaks 201-205 may be delayed by a latency that is determined by temperatures in the thermal density peaks 201-205, gradients in the thermal density peaks 201-205, diffusion coefficients for materials in the processing device 100, distances between the thermal density peaks 201-205 and the other processor cores, and other characteristics.

A thermal sensitivity map such as the thermal sensitivity map 135 shown in FIG. 1 is used to represent the thermal impact of the thermal density peaks 201-205 on the other processor cores or other locations in layers of the 3-D processor stack. As discussed herein, the thermal density peaks 201-205 may at least in part be the result of the different thermal impacts of the threads that are being executed on the processor cores 102, 105, 108, 110 or the GPU 120. Moreover, the threads may be critical or non-critical threads. The SMU 130 shown in FIG. 1 may therefore use information in the thermal density map 200, such as the locations or amplitudes of the thermal density peaks 201-205, to selectively throttle one or more threads to reduce or eliminate some of the thermal peaks 201-205 in the thermal density map 200. Selective throttling is performed based on information in the thermal sensitivity map and an indication of criticality of the threads. For example, if the thread executing on the processor core 105 (which is responsible for the thermal density peak 202) is a critical thread, and the thermal sensitivity map indicates that the temperature of the processor core 105 is sensitive to temperatures in the processor cores 102, 108, the SMU may selectively throttle non-critical threads executing on the processor cores 102, 108 to reduce the amplitude of the thermal density peak 202. Thus, a thermal emergency in the processor core 105 may be addressed without throttling the critical thread executing on the processor core 105 so that overall performance of the processing device 100 is maintained.

Figure 3:
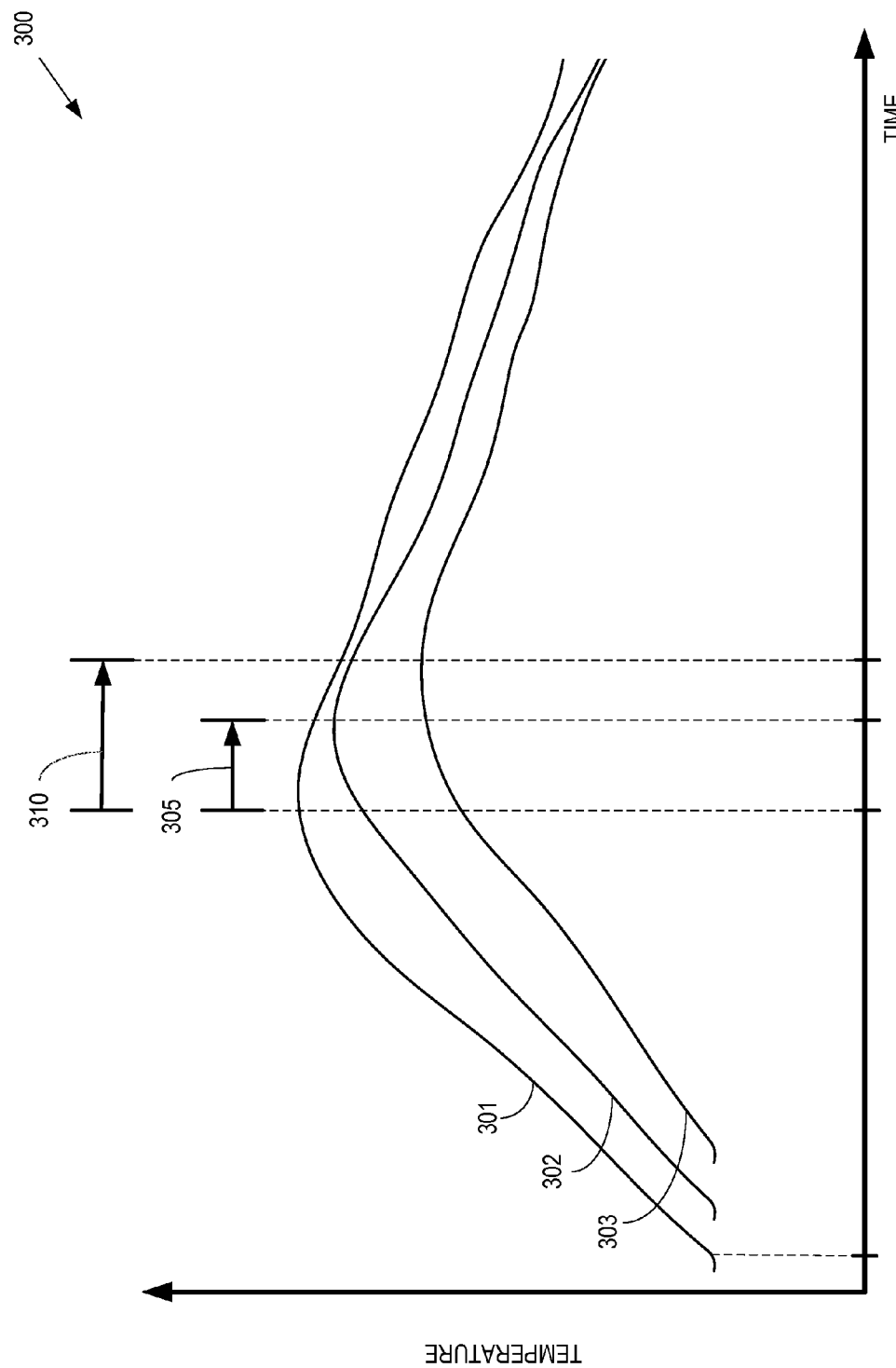
FIG. 3 is a diagram of temperatures at different locations in a 3-D processor stack as a function of time according to some embodiments.

FIG. 3 is a diagram 300 of temperatures at different locations in a 3-D processor stack as a function of time according to some embodiments. The vertical axis indicates temperature and the horizontal axis indicates time in arbitrary units. The diagram 300 illustrates temperature curves 301, 302, 303 for three locations in the 3-D processor stack. Some embodiments of the temperature curves 301-303 indicate average temperatures of the layers 150-152 in the 3-D processor stack shown in FIG. 1. However, the diagram 300 may also represent temperatures at other locations in the 3-D processor stack shown in FIG. 1.

At T1, a thread begins executing on one or more processor cores that corresponds to the location represented by the temperature curve 301. Heating at the location of the one or more processor cores that are executing the thread causes the temperature measured at the location to rise to a peak at time T2 and then to decline at later times.

The temperature at the location represented by the temperature curve 302 begins to rise at a time subsequent to T1 due to the diffusion of heat from the location represented by the temperature curve 301. The temperature curve 302 rises to a peak at the time T3. The peak of the temperature curve 302 is lower than the peak of the temperature curve 301 and the relative values of the peaks is determined by the temperature sensitivity of the location represented by the curve 302 to temperature changes at the location represented by the curve 301. The peak of the temperature curve 302 also occurs at a later time than the peak of the temperature curve 301 due to a latency 305, which may be determined by a diffusion timescale between the locations represented by the temperature curves 301, 302.

The temperature at the location represented by the temperature curve 303 begins to rise at a time subsequent to T1 due to the diffusion of heat from the location represented by the temperature curve 301. The temperature curve 303 rises to a peak at the time T4. The peak of the temperature curve 303 is lower than the peaks of the temperature curves 301, 302 and the relative values of the peaks is determined by the temperature sensitivity of the location represented by the curve 303 to temperature changes at the location represented by the curve 301. The peak of the temperature curve 303 also occurs at a later time than the peaks of the temperature curves 301, 302 due to a latency 310, which may be determined by a diffusion timescale between the locations represented by the temperature curves 301, 303. The latency 310 is larger than the latency 305, e.g., because a distance between the location represented by the temperature curve 303 and the location represented by the temperature curve 301 is larger than a distance between the location represented by the temperature curve 302 and the location represented by the temperature curve 301.

Figure 4:
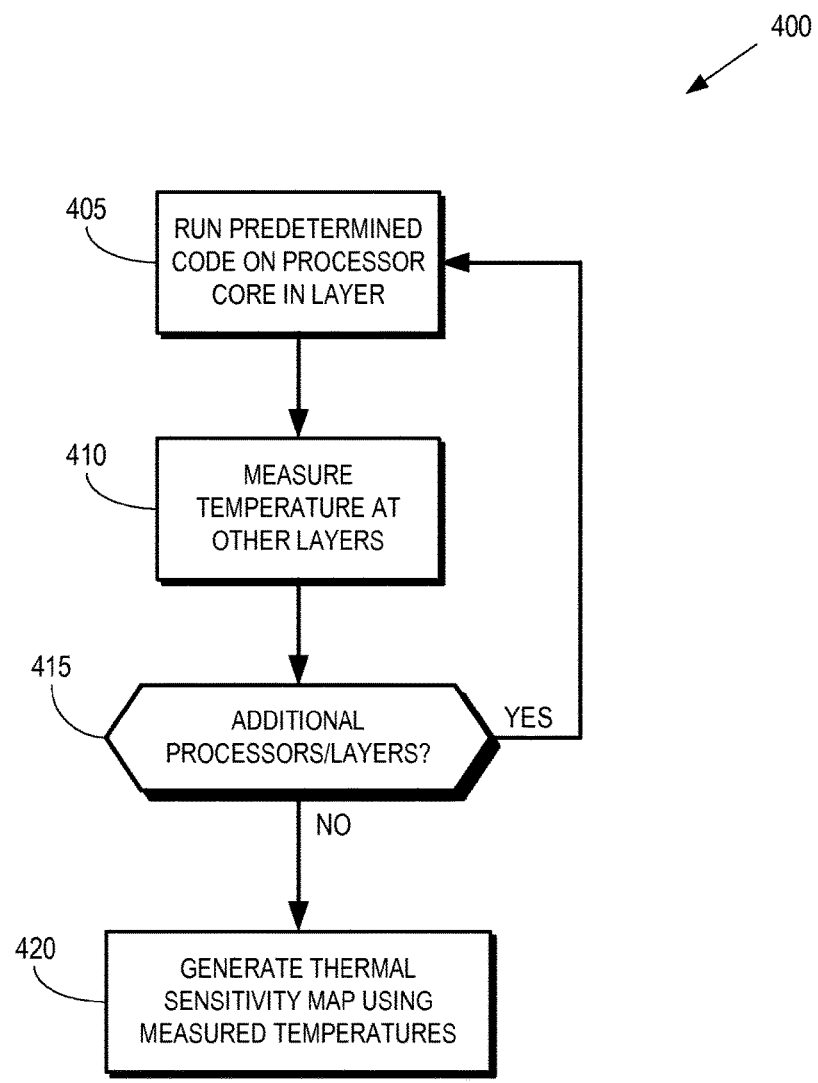
FIG. 4 is a flow diagram of a method of generating a thermal sensitivity map according to some embodiments.

FIG. 4 is a flow diagram of a method 400 of generating a thermal sensitivity map according to some embodiments. The method 400 may be implemented in, for example, the processing device 100 shown in FIG. 1. At block 405, predetermined code is run on a processor core in a first layer. The predetermined code may be constructed to generate a predetermined peak temperature, temperature profile, or other thermal characteristics. At block 410, one or more temperature sensors in the processing device measures temperatures at their corresponding locations in response to execution of the predetermined code on the processor core in the first layer. The measured temperatures may include measurements performed in other layers of a 3-D processor stack or measurements of temperatures at the locations of other processor cores or other entities in the first layer. The processing device stores the measurements, e.g., in a memory element implemented by the processing device.

At decision block 415, the processing device determines whether there are additional processors in the first layer or other layers that include other processors that generate heat in response to executing code. If so, the processing device executes (at block 405) the predetermined code on the additional processors, measures (at block 410) temperatures using the temperature sensors, and stores the measured values. The blocks 405, 410, 415 are iterated until the predetermined code has been executed on each processor core in the 3-D processor stack. Although the same predetermined code is executed on all the processors at block 405, some embodiments may use different predetermined codes on different processors. The method 400 then flows to block 420.

At block 420, the processing device generates a thermal sensitivity map using the measured temperatures. Some embodiments of the processing device generate the thermal sensitivity map by comparing the temperatures generated at other processors or layers by the processor or layer that was executing the predetermined code. For example, the processing device may determine thermal sensitivities for each pair of processors or layers as a ratio of the peak temperature at one of the processors or layers produced by a peak temperature produced at another processor or layer by executing the predetermined code. For another example, the processing device may determine the thermal sensitivities for each pair processors or layers by comparing thermal profiles of the processors or layers. Some embodiments of the processing device also determine latencies between the different locations that are represented in the thermal sensitivity map. For example, latencies between temperature changes at two locations in the 3-D processor stack can be determined by comparing peak temperatures or temperature profiles to determine a delay between the thermal response at one location due to temperature changes at the other location.

Figure 5:
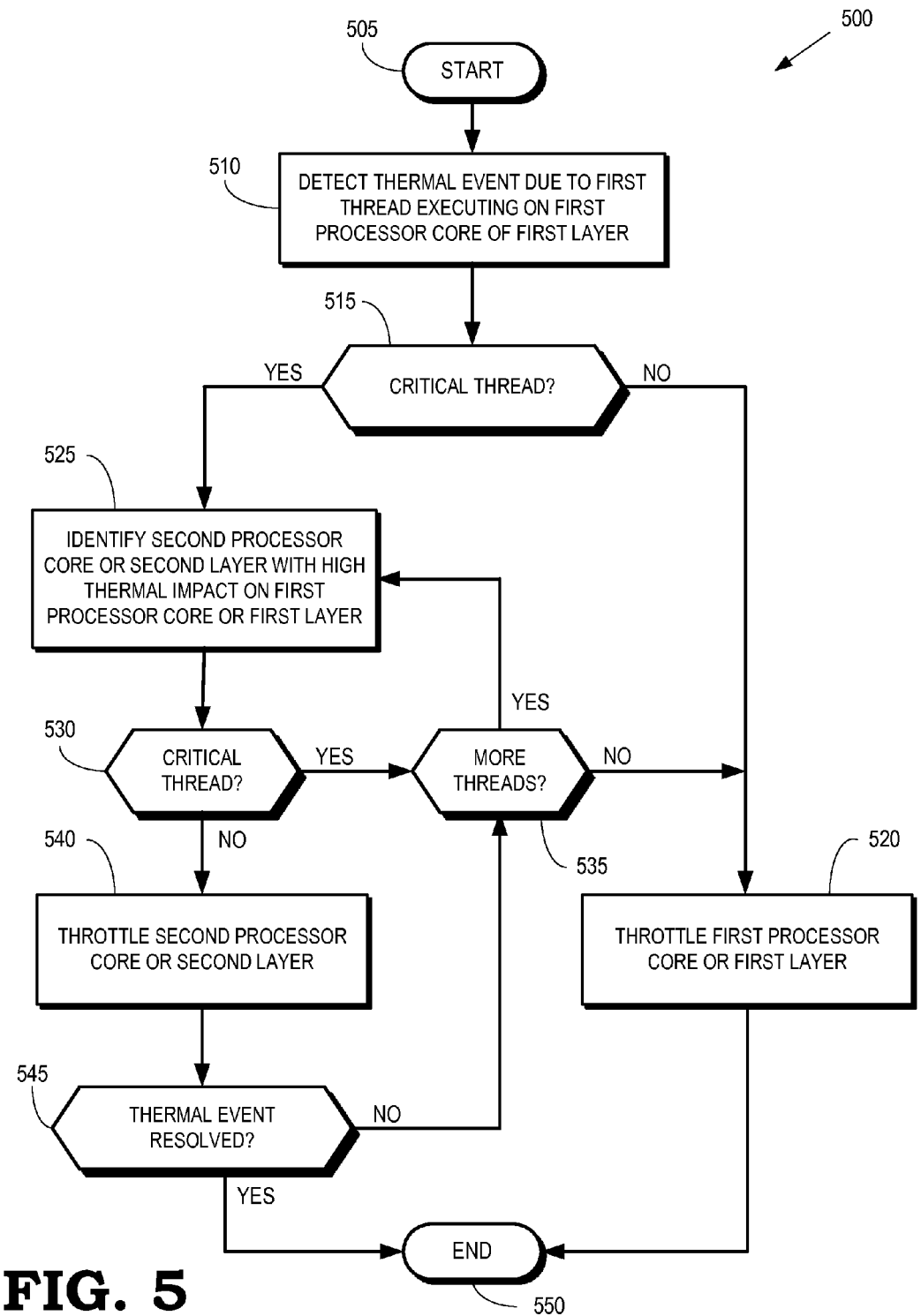
FIG. 5 is a flow diagram of a method for selectively throttling processor cores in layers of a 3-D processor stack according to some embodiments.

FIG. 5 is a flow diagram of a method 500 for selectively throttling processor cores in layers of a 3-D processor stack according to some embodiments. The method 500 may be implemented in, for example, the processing device 100 shown in FIG. 1. The method 500 starts at terminator block 505.

At block 510, the processing device detects a thermal event that is due to a first thread executing on a first processor core in a first layer. The thermal event may be the result of a measured temperature exceeding a threshold, a predicted temperature exceeding a threshold, or other conditions that indicate thermal emergencies associated with the first processor core or the first layer.

At decision block 515, the processing device determines whether the first thread is a critical thread or a non-critical thread. The determination is made based on values of one or more hardware counters, information provided by an operating system or another entity in the processing device, or a combination thereof. If the first thread is a non-critical thread, the method 500 flows to block 520 and the processing device throttles (at block 520) the first processor core or the first layer to reduce heating in the first processor core or the first layer and avoid the actual or predicted thermal emergency. Throttling may include modifying a power supplied to the first processor core or the first layer, changing an operating frequency of the first processor core or the first layer, or changing an operating voltage supplied to the first processor core or the first layer. If the first thread is a critical thread, the method 500 flows to block 525.

At block 525, the processing device identifies a second processor core or second layer that has a high thermal impact on the first processor core or the first layer. Some embodiments of the processing device identify the second processor core or second processor layer based on a thermal sensitivity map such as the thermal sensitivity map 135 shown in FIG. 1.

At decision block 530, the processing device determines whether the thread executing on the second processor core or second layer is a critical thread. If so, throttling the critical thread may have a negative impact on the overall performance of the processing device and consequently the processing device does not throttle the thread executing on the second processor core second layer. The method 500 therefore flows to the decision block 535, where the processing device determines whether there are additional threads executing on other processor cores or layers that can be evaluated based on their thermal impact on the first processor core or the first layer. If so, the method 500 flows back to block 525. If not, the method 500 flows to block 520, where the first processor core or first layer is throttled. If the processing device determines that the thread executing on the second processor core second layer is not a critical thread (at decision block 530), the method flows to block 540.

At block 540, the processing device throttles the non-critical thread executing on the second processor core or second layer. Throttling the non-critical thread may reduce the temperature of the first processor core or first layer, thereby resolving the thermal event. At decision block 545, the processing device determines whether the thermal event has been resolved by throttling the non-critical thread. If not, the method 500 flows to decision block 535, where the processing device determines whether there are more threads that could be throttled to attempt to resolve the thermal event. The method 500 may continue to iterate blocks 525, 530, 535, and 540 to attempt to resolve the thermal event. If throttling the thread executing on the second processor core or second layer during one of the iterations successfully resolves the thermal event (at decision block 545), the method 500 ends at the terminator 550.

FIG. 6 is a diagram of a data structure 600 that includes information indicating thermal couplings between locations in a processing system according to some embodiments. The thermal couplings indicated in the data structure 600 may be used to define a thermal sensitivity map such as the thermal sensitivity map 135 implemented in the processing system 100 shown in FIG. 1. Although the data structure 600 is shown as a table in FIG. 6, some embodiments of the data structure 600 may be implemented in other formats, such as a matrix of entries that include thermal couplings between locations that correspond to the rows and columns of the matrix.

The first column of the thermal coupling data structure 600 indicates a first location in the processing system and the second column indicates a second location in the processing system. The third column indicates a thermal coupling between the two locations. For example, the thermal coupling between Level 1 and Level 2 is HIGH, the thermal coupling between Level 1 and Level 3 is MEDIUM, and the thermal coupling between Level N−1 and Level N is LOW. As discussed herein, other measures of thermal coupling between different locations can be implemented including more or fewer categories to indicate more or fewer degrees or levels of coupling between the different locations. The thermal coupling may also be indicated by a numerical value or function that indicates a temperature change at one of the locations as a function of a temperature change at the other location. The thermal coupling function may also be a function of other variables such as the current temperatures at the locations.

The thermal coupling values in the data structure 600 may be generated experimentally, empirically, or theoretically. For example, the thermal coupling values in the data structure 600 may be generated based on measured thermal characteristics of a sample of processing systems that have been fabricated in silicon. For another example, the thermal coupling values in the data structure 600 may be generated using thermal simulations of a sample of processing systems prior to fabrication in silicon. The values of the thermal couplings in the data structure 600 are stored in a memory for subsequent use. Some embodiments of the data structure 600 are stored in non-volatile memories such as a basic input/output system (BIOS) or a read-only memory (ROM) that can be read by SMU firmware during system boot.

In some embodiments, the apparatus and techniques described above are implemented in a system comprising one or more integrated circuit (IC) devices (also referred to as integrated circuit packages or microchips), such as the processing system described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    generating values of thermal couplings between a plurality of layers of a three-dimensional processor stack that includes a plurality of processor cores, wherein at least one of the plurality of processor cores is implemented in each of the plurality of layers, and wherein the values of the thermal couplings indicate temperature changes in each of the plurality of layers as a function of temperature changes in each of the other layers; and
    in response to a thermal event in one of the plurality of layers, selectively throttling at least one of the plurality of processor cores implemented in the plurality of layers based on the values of the thermal couplings and measures of criticality of threads executing on the plurality of processor cores.

2. The method of claim 1, wherein selectively throttling the at least one of the plurality of processor cores comprises selectively throttling the at least one of the plurality of processor cores based on latencies between temperature changes in the plurality of layers.

3. The method of claim 1, further comprising:
    detecting the thermal event at a first processor core implemented in a first layer; and
    determining whether a first thread executing on the first processor core is a critical thread based on a measure of criticality of the first thread.

4. The method of claim 3, wherein determining whether the first thread is a critical thread comprises determining whether the first thread is a critical thread based on at least one of a criticality indicator provided by an operating system and a value of a hardware event counter associated with the first thread.

5. The method of claim 1, wherein generating the values of the thermal couplings further comprises:
iteratively executing a predetermined code on the plurality of processor cores in each of the plurality of layers; and
measuring temperatures in each of the plurality of layers in response to executing the predetermined code on the plurality of processor cores in each of the plurality of layers; and
determining the values of the thermal couplings between the plurality of layers based on the measured temperatures.

6. The method of claim 5, wherein determining the values of the thermal couplings comprises determining values of latencies between temperature changes in each of the plurality of processor cores in each of the plurality of layers.

7. A method comprising:
generating values of thermal couplings between a plurality of layers of a three-dimensional processor stack;
detecting a thermal event at a first processor core implemented in a first layer; and
determining whether a first thread executing on the first processor core is a critical thread based on a measure of criticality of the first thread; and
in response to the thermal event in one of the plurality of layers, selectively throttling at least one of a plurality of processor cores implemented in the plurality of layers based on the values of the thermal couplings and measures of criticality of threads executing on the plurality of processor cores, wherein selectively throttling the at least one of the plurality of processor cores comprises selectively throttling at least one second processor core implemented in a second layer in response to the first thread being a critical thread and a second thread executing on the second processor core not being a critical thread.

8. The method of claim 7, wherein selectively throttling the at least one second processor core comprises selectively throttling the at least one second processor core based on a thermal coupling between the first layer and the second layer.

9. The method of claim 7, further comprising:
determining whether the thermal event is resolved by throttling the at least one second processor core; and
throttling at least one other processor core in response to determining that the thermal event has not been resolved.

10. An apparatus comprising:
a three-dimensional processor stack comprising a plurality of processor cores implemented in a plurality of layers, wherein at least one of the plurality of processor cores is implemented in each of the plurality of layers; and
a controller to:
generate values of thermal couplings between the plurality of layers based on temperatures measured in the plurality of layers, wherein the values of the thermal couplings indicate temperature changes in each of the plurality of layers as a function of temperature changes in each of the other layers; and
selectively throttle at least one of the plurality of processor cores in response to detecting a thermal event, wherein the controller is to selectively throttle the at least one of a plurality of processor cores based on values of thermal couplings between the plurality of layers and based on measures of criticality of threads executing on the plurality of processor cores.

11. The apparatus of claim 10, wherein the controller is to selectively throttle the at least one of the plurality of processor cores based on latencies between temperature changes in the plurality of layers.

12. The apparatus of claim 10, wherein the controller is to detect the thermal event at a first processor core implemented in a first layer and determine whether a first thread executing on the first processor core is a critical thread based on a measure of criticality of the first thread.

13. The apparatus of claim 12, wherein the controller is to determine whether the first thread is a critical thread based on at least one of a criticality indicator provided by an operating system and a value of a hardware event counter associated with the first thread.

14. The apparatus of claim 10, wherein the plurality of processor cores in each of the plurality of layers are to iteratively execute a predetermined code, and wherein the apparatus further comprises:
a plurality of sensors to measure temperatures in each of the plurality of layers in response to executing the predetermined code on the plurality of processor cores in each of the plurality of layers, and wherein the controller is to generate the values of the thermal couplings between the plurality of layers based on the measured temperatures.

15. The apparatus of claim 14, wherein the controller is to determine values of latencies between temperature changes in each of the plurality of processor cores in each of the plurality of layers.

16. An apparatus comprising:
a three-dimensional processor stack comprising a plurality of processor cores implemented in a plurality of layers; and
a controller to:
generate values of thermal couplings between the plurality of layers based on temperatures measured in the plurality of layers;
detect a thermal event at a first processor core implemented in a first layer;
determine whether a first thread executing on the first processor core is a critical thread based on a measure of criticality of the first thread; and
selectively throttle at least one of the plurality of processor cores in response to detecting the thermal event, wherein the controller is to selectively throttle the at least one of a plurality of processor cores based on values of thermal couplings between the plurality of layers and based on measures of criticality of threads executing on the plurality of processor cores, wherein the controller is to selectively throttle at least one second processor core implemented in a second layer in response to the first thread being a critical thread and a second thread executing on the second processor core not being a critical thread.

17. The apparatus of claim 16, wherein the controller is to selectively throttle the at least one second processor core based on a thermal coupling between the first layer and the second layer.

18. The apparatus of claim 16, wherein the controller is to determine whether the thermal event is resolved by throttling the at least one second processor core and throttle at least one other processor core in response to the thermal event not being resolved.

19. A non-transitory computer readable storage medium embodying a set of executable instructions, the set of executable instructions to manipulate a computer system to perform a portion of a process to fabricate at least part of a processor, the processor comprising:
- a three-dimensional processor stack comprising a plurality of processor cores implemented in a plurality of layers, wherein at least one of the plurality of processor cores is implemented in each of the plurality of layers; and
- a controller to generate values of thermal couplings between the plurality of layers and selectively throttle at least one of a plurality of processor cores in response to detecting a thermal event, wherein the values of the thermal couplings indicate temperature changes in each of the plurality of layers as a function of temperature changes in each of the other layers, and wherein the controller selectively throttles the at least one of a plurality of processor cores based on the values of the thermal couplings and measures of criticality of threads executing on the plurality of processor cores.

20. The non-transitory computer readable storage medium of claim 19, wherein the processor further comprises:
- a plurality of sensors to measure temperatures in each of the plurality of layers in response to iterative execution of a predetermined code on the plurality of processor cores in each of the plurality of layers, and wherein the controller is to generate the values of the thermal couplings between the plurality of layers based on the measured temperatures.

* * * * *